United States Patent [19]

Hayakawa et al.

[11] Patent Number: 4,796,241
[45] Date of Patent: Jan. 3, 1989

[54] DEVICE FOR PRODUCING A HIGH FREQUENCY MODULATION MAGNETIC FIELD USED IN MAGNETO-OPTICAL RECORDING

[75] Inventors: Masatoshi Hayakawa; Takehiro Nagaki; Koichi Aso; Hiroshi Yamanoi, all of Kanagawa, Japan

[73] Assignee: Sony Corporation, Tokyo, Japan

[21] Appl. No.: 5,779

[22] Filed: Jan. 21, 1987

[30] Foreign Application Priority Data

Jan. 23, 1986 [JP] Japan .................................. 61-10996
Aug. 22, 1986 [JP] Japan ................................. 61-195615

[51] Int. Cl.$^4$ ......................... G11B 5/03; G11B 11/12
[52] U.S. Cl. ..................................... 369/13; 360/114; 360/59; 365/122
[58] Field of Search ................... 369/13; 360/114, 59; 365/122; 336/186, 187, 83

[56] References Cited

U.S. PATENT DOCUMENTS 3,946,349  3/1976  Haldeman, III ..................... 336/62
4,507,640  3/1985  Rich, III et al. ..................... 336/83

FOREIGN PATENT DOCUMENTS 56-16917    2/1981   Japan .................................. 360/114
57-66537    4/1982   Japan .................................... 369/13
57-94906    6/1982   Japan .................................... 369/13
57-186209  11/1982   Japan .................................... 369/13
59-119507   7/1984   Japan ................................... 360/114
61-148687   7/1986   Japan .................................... 369/13
0321852     1/1972   U.S.S.R. .............................. 360/59
1053170    11/1983   U.S.S.R. ............................. 336/186

Primary Examiner—Alan Faber
Assistant Examiner—Noa T. Nguyen
Attorney, Agent, or Firm—Hill, Van Santen, Steadman & Simpson

[57] ABSTRACT

A device for producing a high frequency modulating magnetic field is disclosed. The device is especially useful to achieve real-time overwriting in magneto-optical recording. The device produces magnetic field modulated according to a signal to be recorded on a magneto-optical recording medium in which the signal is recorded in the form of magnetization direction on the magneto-optical recording medium under irradiation of a laser beam to raise the temperature of the medium. The device comprises a main magnetic pole formed of a low-loss soft magnetic material and having one end facing to the magnetic-optical recording medium and a sheathed conductor wound around the main magnetic pole and consisting of a parallel connection of a plurality of insulated elementary wires.

5 Claims, 9 Drawing Sheets

DEVICE FOR PRODUCING A HIGH FREQUENCY MODULATION MAGNETIC FIELD USED IN MAGNETO-OPTICAL RECORDING

BACKGROUND OF THE INVENTION

1. Field of the Invention

This invention relates to a device for producing a high frequency modulation magnetic field that is used for applying a modulating magnetic field in a magneto-optical recording and/or reproducing device. More particularly, it relates to such device allowing real time overwriting of recording signals in the high frequency range.

2. Prior Art

Magneto-optical recording is the recording system in which information signals are written on an magneto-optical recording medium such as an magneto-optical disk, by application of heat generated by a laser light. The magnetization direction is determined by a magnetic field applied to the heated portion upon cooling.

One of the features of the magnetic-optical recording is that it is possible to re-write the information signals. Thus, in the magneto-optical recording system, it is possible to write new data in an area of the magneto-optical recording medium where a recording pattern was written previously.

Such re-writing is effected by inverting the bias magnetic field. For providing the strong bias magnetic field having more than a predetermined magnetic field intensity, it is known to use a permanent magnet for excitation of the magnetic field. In this method, the permanent magnet is moved by mechanical means for inverting the direction of the magnetic field, and the recording and erasure processes are provided separately. For example, the magnet is mechanically inverted in its position after the first erasure for recording on the area on the magnetic recording medium from which the recording has just been erased.

It is also known to use distinct erasure and recording devices that are adapted to take charge of different portions of the overwrite function. In this known method, erasure and recording are effected at the different portions on the optomagnetic recording medium. However, real-time recording is difficult to achieve with the above described methods.

With the first method of using the permanent magnet, high-speed operation is not realized with ease because of unavoidable limitations placed on the operating speed. With the method of using the distinct erasure and recording devices, since the devices are located at the spatially separate positions, it is not possible to achieve a completely consecutive recording especially in the case of the magneto-optical recording with a high recording density.

Figure 10:
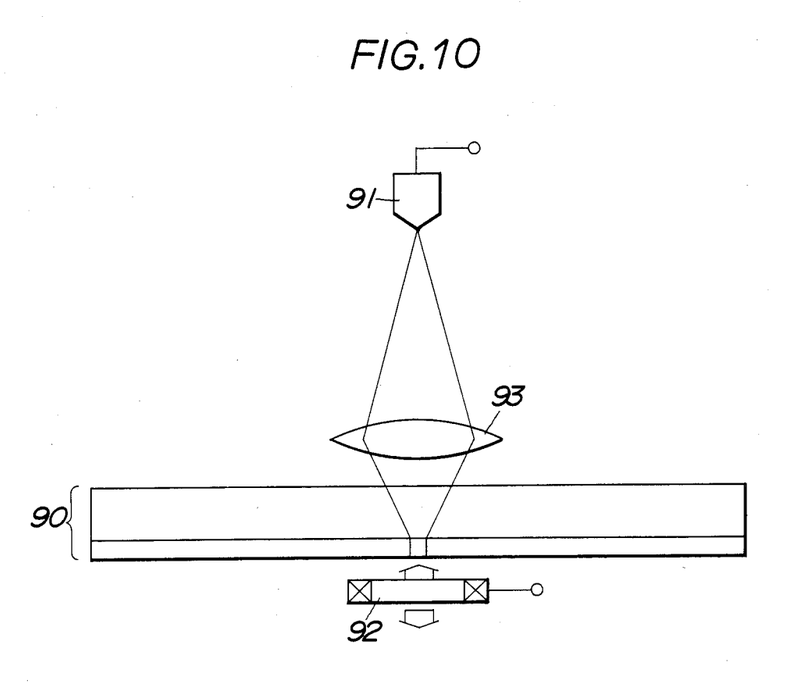
FIG. 10 is a schematic view for explaining the principle of the magnetic field modulating system.

On the other hand, real-time overwriting can be achieved by using a magnetic field modulation system as shown in FIG. 10. In this system, there are provided a laser device 91 for heating an magneto-optical recording medium 90 by a laser beam through a lens 93 and a magnetic field producing device 92 for producing the magnetic field modulated by input signals.

However, when a high frequency current such as several MHz are supplied to the magnetic field producing device 92 in order to meet the demand for high speed operation or improvement in the recording density, it is not possible to attain the desired magnetic field intensity, while there is also an inconvenience of heat generation.

Thus, in the magnetic field modulation system, it is necessary to apply a magnetic field of a high constant intensity in order to invert the direction of magnetization of the magneto-optical recording medium 90. However, when the high frequency signals are supplied, it becomes difficult to achieve the desired strong magnetic field because of frequency characteristics of the core material of the magnetic field producing device 92. Conversely, it is possible to produce a magnetic field sufficient to invert the magnetization direction by increasing the signal current supplied to the magnetic field producing device 90. However, in this case, problems are presented when the core characteristics are deteriorated due to heat generation or when the temperature becomes higher than the Curie temperature. As a result, it becomes impossible to produce the strong magnetic field required in the high frequency range. In addition, a stable recording operation is sometimes impossible to achieve because the heating performance of the laser beam is affected by the heat produced from the magnetic field producing device 90.

OBJECT AND SUMMARY OF THE INVENTION

It is an object of the present invention to provide a device for producing high frequency modulating magnetic field used in magneto-optical recording.

It is another object of the present invention to provide a device for producing high frequency modulating magnetic field which can achieve real-time overwriting in magnetooptical recording. It is further object of the present invention to provide a device for producing high frequency modulating magnetic field used in magneto-optical recording without generating temperature increase in the device.

According to one aspect of the present invention, there is provided claim 1.

DESCRIPTION OF THE PREFERRED EMBODIMENTS

The above problems are solved by the present invention by a device for producing a high frequency modulating magnetic field comprising a main magnetic pole formed of a low-loss soft magnetic material and having one end facing to an magneto-optical recording layer, and a sheathed conductor wound about said main magnetic pole and consisting of an assembly of a parallel connection of a plurality of insulated elementary wires.

As the low-loss soft magnetic material forming the main magnetic pole, the material having low hysteresis loss or eddy current loss, that is, the material having a high specific electrical resistance and a low coercive force may be employed. The low-loss magnetic material may include Ni-Zn ferrite, as an example.

The insulated elementary conducting wires that are wound on the main magnetic pole and connected in parallel to one another for constituting a sheathed copper wire are of an extremely small diameter so that the skin effect for the operating frequency may be disregarded. Thus the diameter of the elementaly wire need only be of the order of twice the skin depth for the operating frequency.

The sheathed conductor placed about the main magnetic pole consists of an assembly of plural insulating elementary wires connected in parallel to one another. In this manner, the phenomenon in which the current flows predominantly in the peripheral portion, or the skin effect, may be prevented, thus resulting in the suppression of heat generation from the sheathed conductor. In addition, the low-loss magnetic material is used as the material for the main magnetic pole. In this manner, in conjunction with the use of the sheathed conductor consisting of the insulated elementary wires, the magnetic field may be produced efficiently for the high frequency range without causing an inconvenience such as heat generation.

A preferred embodiment of the present invention is hereafter explained by referring to the accompanying drawings.

With the device for producing a high frequency modulating magnetic field for high frequency modulation according to the present invention, it becomes possible to realize real-time data overwriting in the magneto-optical recording. The device is free from deficiencies such as heat generation and excellent in high-frequency characteristics.

EXAMPLE 1

Figure 1:
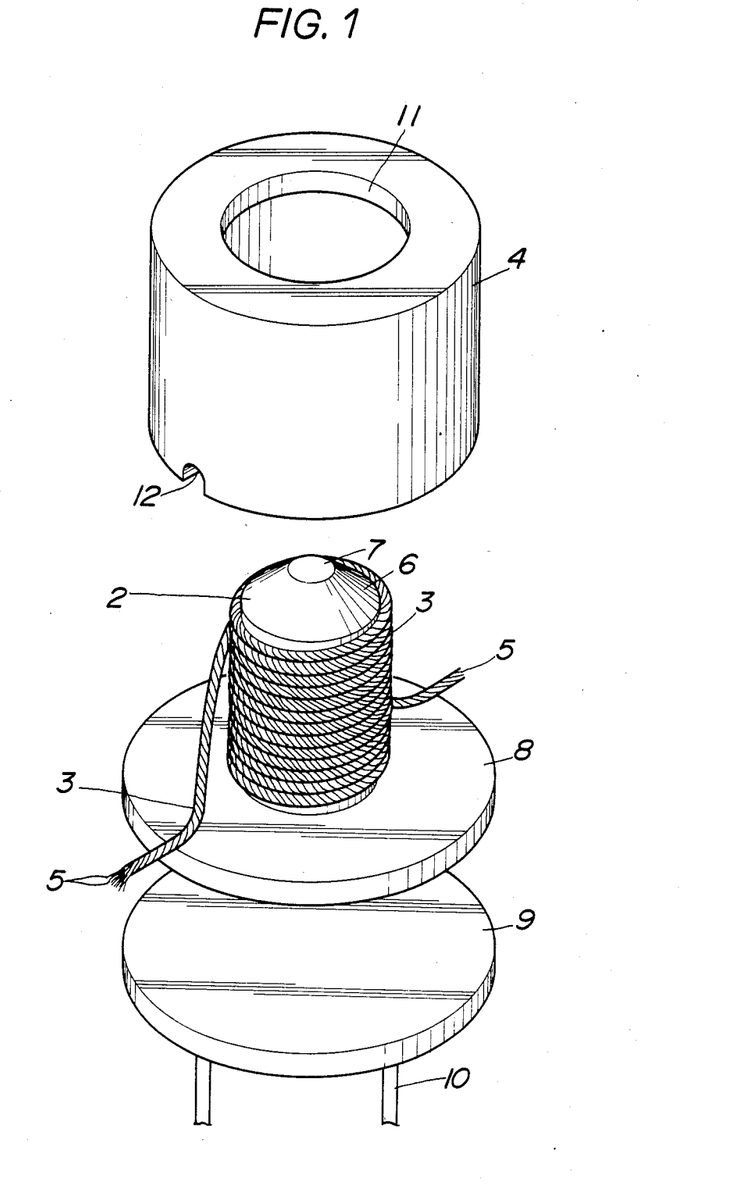
FIG. 1 is an exploded perspective view of a high-frequency modulation field producing device of the present invention.

A device 1 for producing a high frequency modulating magnetic field according to the Example 1 is shown in FIG. 1 and comprised of a main magnetic pole 2 formed of a low-loss soft magnetic material and facing at one end to a magneto-optical recording layer, and a sheathed conductor 3 consisting of a parallel connection of plural elementary wires 5 and wound around the main magnetic pole 2. A tapered part 6 is formed in the main magnetic pole 2 and a yoke 4 is provided for the case in which the device is mounted in close proximity to the magneto-optical recording medium. The main magnetic pole 2 has a bottom 8 is the form of a disk projecting at right angles with the axial direction or the direction of rotational symmetry of the main magnetic pole 2 for attachment to the yoke 4. A base 9 for securing these components is mounted below the bottom 8 of the main magnetic pole 2 and a lead wire 10 is provided in the base 9 for wiring each ends of the sheathed conductor 3 thereto.

The main magnetic pole 2 is a sintered member in the form of a cylinder formed of Ni-Zn ferrite which is a lowloss magnetic material having a saturation magnetic flux density of 3700 G and a coercive force of 0.55 Oersted. The sheathed conductor 3 is placed about the periphery of the pole 2. The foremost part 7 of the magnetic pole 2 opposing to the magneto-optical recording medium is formed as a flat circular surface. Between the foremost part 7 and the peripheral surface of the main pole 2, there is provided a tapered part 6 which is an inclined surface difining an angle of 45° with the axis of rotation or rotational symmetry of the main pole 2. The tapered part 6 is effective to produce the magnetic field and to apply a magnetic field to the magneto-optical recording medium when the latter is placed in proximity thereto as later described. The main pole 2 has a height about equal to 3 mm, while the cylindrical portion of the main pole 2 excepting the bottom 8 thereof is about equal to 3 mm. The foremost part 7 of the magnetic pole is about equal to 1 mm.

The sheathed conductor 3 placed about the periphery of the main magnetic pole 2 is composed of a parallel connection of a bundle of a number of, about 23 herein, insulated elementary wires 5 formed of a low resistance material such as copper and each having a diameter about equal to 0.1 mm. Since the sheathed conductor 3 is made up of the insulated elementary wires 5, there is no risk that the effective resistance thereof be increased under the skin effect under a high frequency range of the order of several MHz so that the main magnetic pole 2 can be excited without any excess heat generation. For such excitation, the sheathed conductor 3 is wound about the periphery of the main magnetic pole 2 by 13 turns and secured thereto with an adhesive.

The yoke 4 is formed of the same low-loss magnetic material as the main magnetic pole 2 and acts as a magnetic path or what is called a magnetic return path. The yoke 4 acts in the same effective manner as the tapered part 6 when it is brought to close to the magneto-optical recording medium. The side of the yoke 4 facing to the magneto-optical recording medium is extended axially while the center of the yoke 4 is cut out to form a circular through-hole 11 confronted by the main magnetic pole 2 having a diameter approximately equal to 4 mm. The yoke 4 has an axial length about equal to 9 mm, while it has an outside diameter about equal to 7 mm and an inside diameter about equal to 6 mm. A slot 12 is formed in a junction part of the yoke 4 to the bottom of the main magnetic pole 2 for taking out the sheathed conductor 3.

Figure 2:
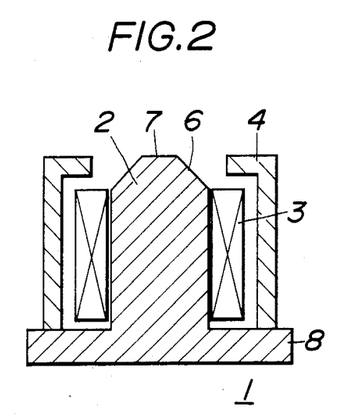
FIG. 2 is a cross-sectional view thereof.

The device 1 for producing a high frequency modulating magnetic field according to the present invention is shown in FIG. 2 in cross-section.

Figure 6:
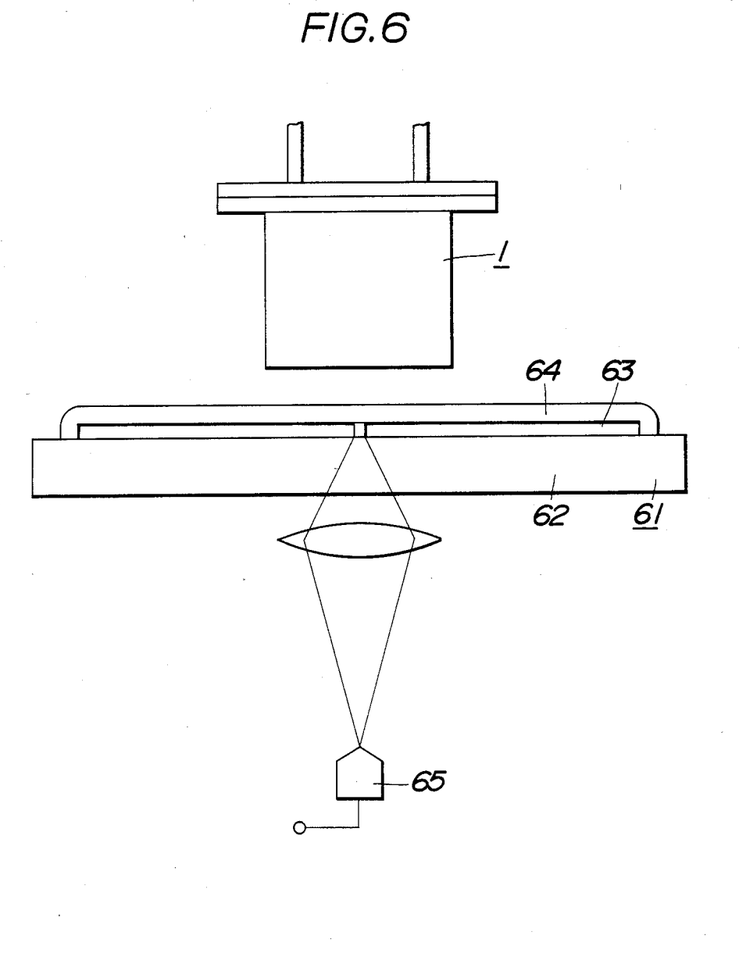
FIG. 6 is a side elevation showing the operative state of the high-frequency modulation field producing device of the present invention.

The above described device 1 for producing the magnetic field of the first embodiment may be operated in conjunction with a magneto-optical recording medium as shown in FIG. 6.

Thus, as shown in FIG. 6, the magneto-optical recording medium 61 is formed by a magneto-optical recording layer 63 formed on a substrate 62 made of, for example, polycarbonate resin, methacrylate resin or glass and coated by a protective film 64. The magneto-optical recording layer 63 may for example be a Tb-Fe-Co film with a thickness of about 1000 Å. The protective film is formed of silicon nitride, silicon oxide or synthetic resin and about 1 μm in thickness.

The device 1 of the present embodiment is used in conjunction with the above described magneto-optical recording medium 61. The device 1 for producing the high frequency modulation magnetic field is disposed at the side of the magneto-optical recording medium 61 opposite to the side thereof at which there is provided a laser device 65 adapted for heating the magneto-optical recording medium 63 to a temperature higher than the Curie temperature of the magneto-optical recording layer.

When the input signal is a high frequency signal, the device 1 for producing the high-frequency modulating field exhibits high-frequency characteristics as later described so that the output magnetic field can be inverted in dependence upon the input signals to provide for facilitated overwriting.

TEST EXAMPLE 1

Test results on the high-frequency modulation field producing device 1 of the present embodiment manufactured by way of a trial will be described. In conducting the test, 1 MHz high frequency current was supplied to the device 1 and the current waveform as well as the waveform of the induced magnetic field was measured.

Figure 7:
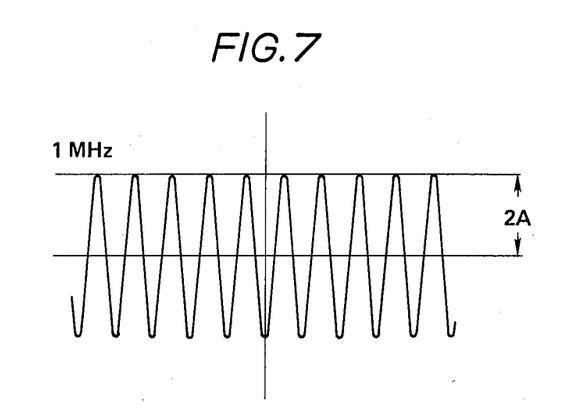
FIG. 7 shows a current waveform in case of supplying 1 MHz current.
Figure 8:
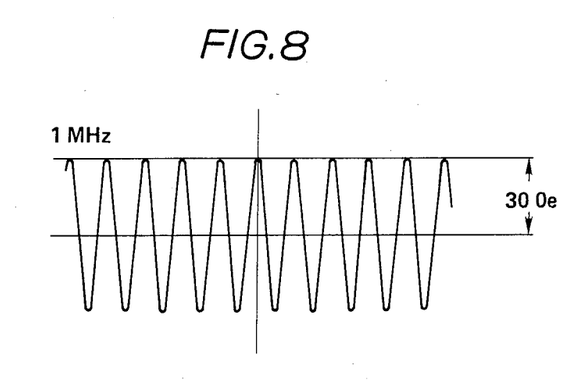
FIG. 8 shows a magnetic field waveform corresponding thereto.

FIG. 7 shows the waveform of the supplied current which is sinusoidal and has a peak value of 2A (ampere). An electrical current probe and a synchroscope were used for the current measurement. FIG. 8 shows the waveform of the induced magnetic field at a point 0.7 mm spaced apart from the surface of the main magnetic pole. The peak value of the magnetic field is 30 Oersted from which it is seen that the high frequency magnetic field corresponding to the high frequency current is produced. In making this measurement, the output voltage of a calibrated integrating unit is measured with a synchroscope using a one-turn pickup coil with a diameter of 3 mm.

During the test, the current was supplied for a time interval of about 30 minutes. The temperature rise the high-frequency modulation field producing device 1 experienced during this time interval was not higher than 20° C.

TEST EXAMPLE 2

A test was conducted on the relation between the size of the high-frequency modulation field producing device 1 of the Example 1 and the self-inductance as well as the magnetomotive force. For the test, the high-frequency modulating field producing devices formed of the same material as and similar in shape to the device 1 of the Example 1 but having core parts of respectively different sizes were prepared. The main magnetic poles had cross-sectional areas equal to 121 mm², 36 mm² and 7 mm². For each of these main poles, the coefficients of self-induction and the magnetomotive force were found in relation to the number of turns. The results are shown in Table 1.

TABLE 1

| | | cross-sectional area of magnetic poles (mm²) | | |
|---|---|---|---|---|
| | | 121 | 36 | 7 |
| coefficients of self-inductance (μH/N²) | | 0.093 | 0.039 | 0.028 |
| magnetomotive force (AT) producing 200 Oe | d = 1 mm | 160 | 108 | 87 |
| | d = 0.1 mm | 48 | 32 | 26 | d = distance from the main magnetic pole surface

It may be concluded from the test results shown in Table 1 that the lesser is the area of the main magnetic pole, the lesser becomes the magnetomotive force (AT; ampere-turns) necessary for producing the required magnetic field (200 Oersted). Hence, the magnetic field can be produced more efficiently by reducing the size of the high-frequency modulating field producing device in its entirety.

COMPARATIVE EXAMPLE 1

For comparison sake, the sheathed conductor 3 of the high-frequency modulations magnetic field producing device 1 consisting of a parallel connection of plural insulated elementary wires was replaced by a single winding (copper wire) which was fed with current. The winding was of a 13-turn and had a diameter of 0.25 mm. The 1 MHz sinusoidal current (with the maximum current intensity of 2A) was supplied to the conductor.

As a result, the temperature rise exceeded about 100° C. during the 10-minutes interval. This is because the copper skin depth for 1 MHz is about 100 microns and hence the effective cross-sectional area of the single widing becomes insufficient for the above current. Hence, heat generation may be suppressed more positively by using the insulated elementary wires 5 than by using the single winding.

EXAMPLE 2

The high-frequency modulating field producing device of the present invention can be constructed with a tapered part of a different shape from that of the tapered part 6 of the above-described device 1 of the Example 1.

Figure 3:
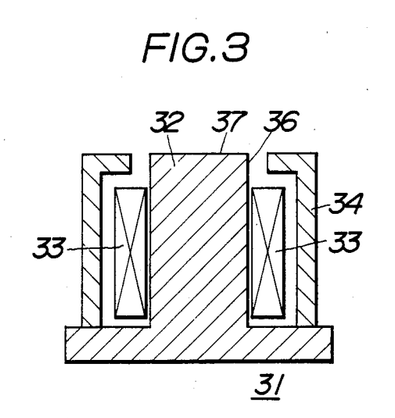
FIG. 3 is a cross-sectional view of a high-frequency modulation field producing device according to the second embodiment of the present invention.

A high-frequency modulation field producing device 31 of the Example 2 is shown in FIG. 3 wherein there is no tapered part but the foremost part 37 and the peripheral surface 36 of the main magnetic pole 32 meet each other at a right angle. The main magnetic pole 32 is formed of Ni-Zn ferrite and the winding placed about the main magnetic pole 32 is the sheathed conductor 33 consisting of a parallel connection of plural insulating elementary wires. The numeral 34 designates the yoke constituting the magnetic path. The size and the material of these components are similar to those of the high-frequency modulation field producing device 1 of the proceding Example 1.

The main magnetic pole 22 may be formed in this manner without the tapered part. However, the shape of the tapered part may be optimized from the spatial intensity distribution of the exciting magnetic field.

EXAMPLE 3

Figure 4:
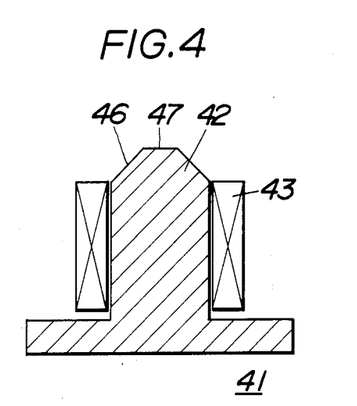
FIG. 4 is a cross-sectional view of a high-frequency modulation field producing device according to the third embodiment of the present invention.

A high-frequency modulation field producing device 41 according to an Example 3 is as shown in FIG. 4 wherein the yoke 4 is omitted from the high-frequency modulation field producing device of the preceding Example 1. The yoke 4 formed of the same low-loss material as the main magnetic pole and acting as the magnetic-path may be occasionally omitted for more effective operation as later described in dependence upon the distance between the magneto-optical recording medium and the foremost of the main magnetic pole.

It will be noted that the material of the main magnetic pole 42, the size of the pole 42, the tapered part 47 and the sheathed conductor 43 may be the same as those of the device 1 of the preceding Example 1.

EXAMPLE 4

Figure 5:
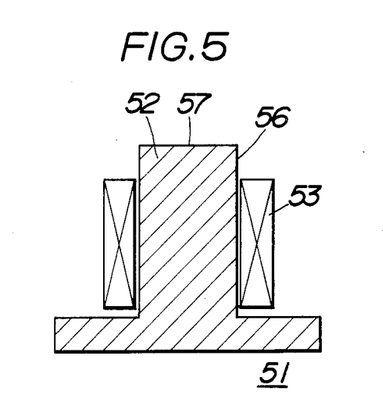
FIG. 5 is a cross-sectional view of a high-frequency modulation field producing device according to the fourth embodiment of the present invention.

A high-frequency modulation field producing device 51 of the Example 4 is as shown in FIG. 5 wherein both the yoke 4 and the tapered part 6 are omitted from the high-frequency modulation field producing device 1 of the preceding Example 1. Thus, as shown in cross-section in FIG. 5, the foremost part 57 and the peripheral surface 56 of the main magnet (is) pole 52 meet each other at a right angle without the provision of the yoke or the tapered part.

It will be noted that the material of the main magnetic pole 52, the size of the pole 52 and the foremost part 57 or the structure of the sheathed conductor 53 are the same as those of the device 1 of the preceding Example 1.

The high-frequency modulation field producing devices 1, 31, 41 and 51 according to the above described Examples 1 to 4 were produced. The D.C.1A current was supplied to these devices and the relation between the magnetic field intensity and the distance from the main magnetic pole surface was measured using Gauss meter.

Figure 9:
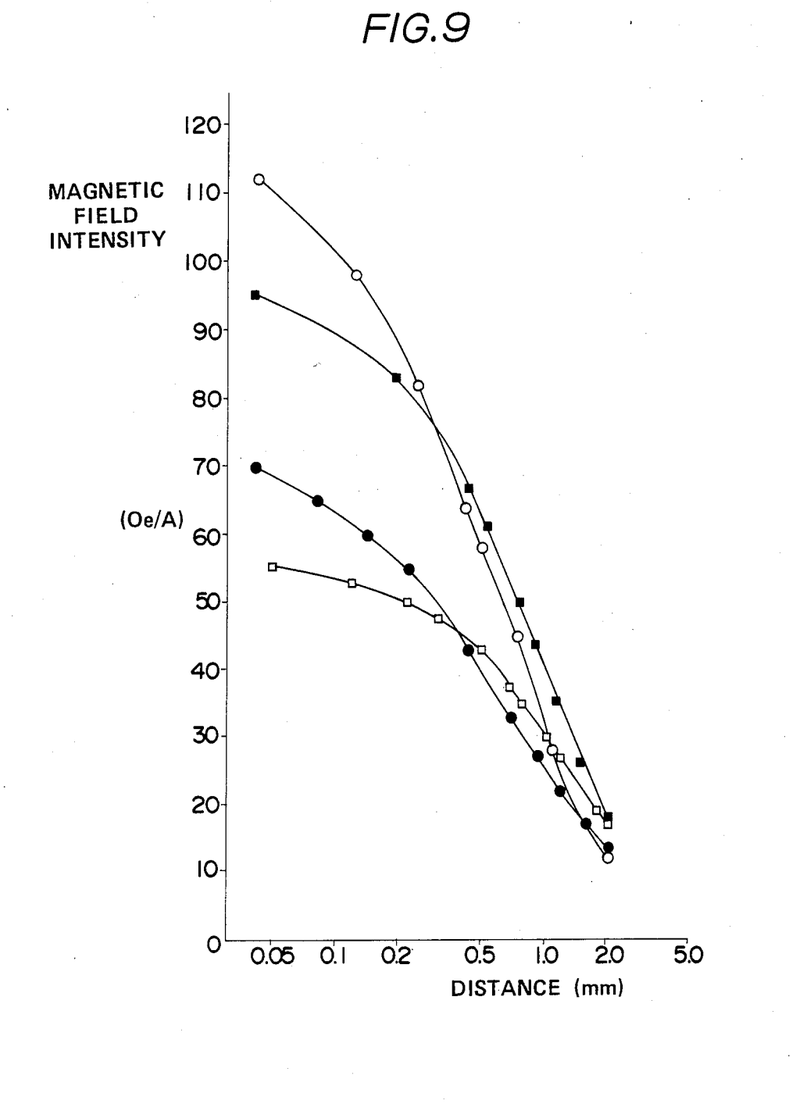
FIG. 9 is a graph showing the characteristics of the high-frequency modulation field producing device according to the first to fourth embodiments.

The results are shown in FIG. 9 wherein the distance (mm) from the main magnetic pole surface is plotted on the abscissa and the magnetic field intensity (Oe/A) is plotted on the ordinate. In this figure, the marks O, ▨, ● and □ denote the properties of the first to fourth Examples of the high-frequency modulation field producing devices, respectively.

It is seen from the results shown in FIG. 9 that the magnetic field can be produced efficiently by providing the yoke or providing the tapered part to the main magnetic pole in case the main magnetic pole surface and the opto-magnetic recording medium are at a closer distance from one to the other.

EXAMPLE 5

Figure 11:
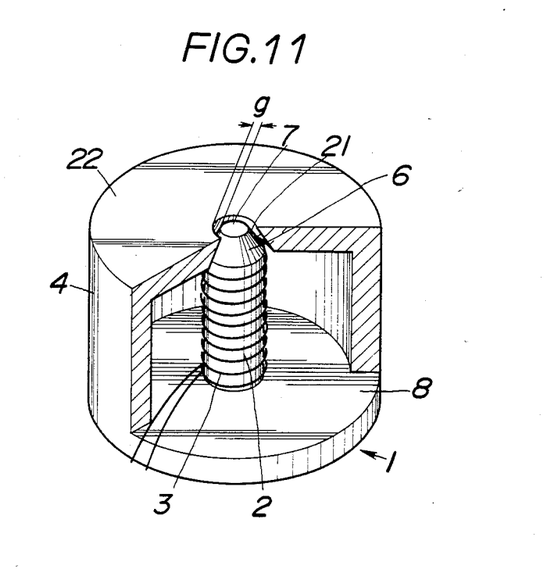
FIG. 11 is a perspective view of a device for producing high frequency modulating magnetic field according to the fifth embodiment of the present invention, with a portion being broken away.
Figure 12:
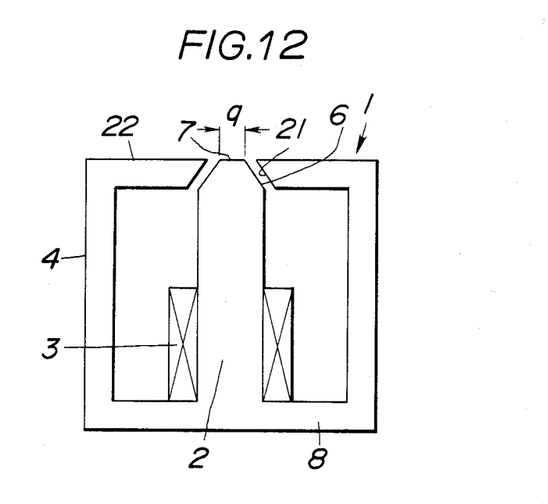
FIG. 12 is a sectional view thereof.

Further example of the high frequency modulating field producing device is shown in FIGS. 11 and 12. The device has similar structure to the device described in Example 1 except the gap portion between the tapered part 6 of the magnetic pole 2 and the inner face of the circular through-holl21.

The opening 21 has the shape of a circle when seen in a section normal to the axis of the main magnetic pole 2. However, when seen in a section in the axial direction of the main magnetic pole 2, as shown in FIG. 12, there is formed a gap g having a substantially uniform distance from the tapered portion 6 of the main magnetic pole 2. In the present magnetic field producing device 1, since the gap g of the substantially uniform width is formed between the yoke 4 and the tapered portion 6 of the main magnetic pole 2, the amount of the magnetic fluxes in the magnetic path from the pole 2 directly to the yoke 4 is decreased and therefore the amount of the magnetic fluxes applied to the opto-magnetic medium is increased thus assuring a positive opto-magnetic recording.

It should be noted that an angle O of the tapered portion 6 of the main magnetic pole 2, or an angle between the lateral side of the tapered portion 6 and the axis of the main magnetic pole 2, is not larger than 50°, and preferably not larger than 45°, for efficient production of a strong magnetic field. On the other hand, the width q of an upper side 7 of the main magnetic pole 2 is 0.1 to 3 mm and preferably 0.1 to 1 mm for preventing the magnetic fluxes from spreading apart and for producing a magnetic field suitable for high density opto-magnetic recording and erasure.

Figure 13:
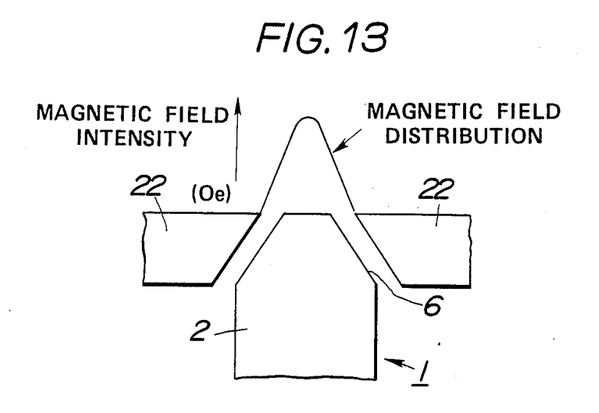
FIG. 13 is a diagram for illustrating the distribution of the magnetic field produced by the device shown in FIG. 11.

The magnetic field produced by the magnetic field producing device 1 was measured and found to have the distribution as shown in FIG. 13. In this figure, the main magnetic pole 2 and the extension 22 of the yoke 4 are shown together with the strength of the magnetic field entered at the corresponding positions. The magnetic field distribution shows single-peak characteristics with the peak being on the center axis of the main magnetic pole 2.

EXAMPLE 6

Figure 14:
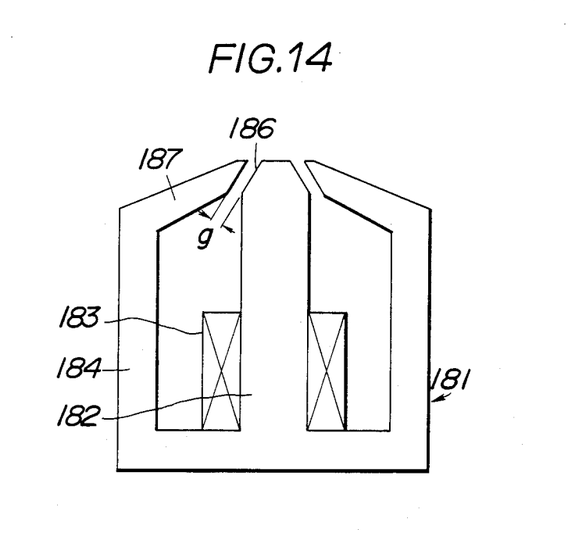
FIG. 14 is a sectional view showing the configuration of a device for producing a high frequency modulating magnetic field according to the sixth embodiment of the present invention.

A modulating magnetic field producing device 181 according to the sixth embodiment is shown in cross-section in FIG. 14 wherein an extension 187 of a yoke 184 extending towards a main magnetic pole 182 on the side facing to an magneto-optical recording medium is inclined downwards such that it is spaced further apart from the recording medium as the extension 187 is spaced further apart from the axis of the main magnetic pole 182.

Thus, in the modulating field producing device 181, shown in FIG. 14, a winding 183 is placed on a main magnetic pole 182 for exciting the pole 182 magnetically as in the preceding embodiments. In the present embodiment, a tapered surface 186 is formed on the side of the main magnetic pole 182 facing to the magneto-optical recording medium and a yoke 184 has an extension 187 the end face of which faces to the tapered surface 186 with a substantially uniform gap g inbetween. This extension 187 is not in the form of a flat disk but is inclined such that it is spaced further apart from the magneto-optical recording medium as it is spaced further part from the central axis of the main magnetic pole 182.

In the modulating magnetic field producing device 181 having the inclined extension 187, the properties of the produced magnetic field are not affected despite the inclined disposition of the extension 187, so that the device 181 is suitable for magneto-optical recording, similarly to the preceding first embodiment. In addition, since the yoke 184 is swept back, the device 181 can be mounted easily with visual checking although the distance between the extension and the recording medium is delicately changed, while there is no risk of a possible contact with the magnetic-optical recording medium.

The measured data of the modulating field producing device 181 of the above described sixth embodiment are given as follows. First of all, the current of 1A was supplied to a winding 183 and the produced magnetic field was measured. Thus the measured values of the magnetic field were 200 and 105 oersted for the aforementioned distance c of 0.1 and 0.3 mm, respectively. In this respect, the data for the magnetic field producing device 181 of the present embodiment are equivalent to those of the magnetic field producing device 1 of Example 5.

As a result of simulation by using the finite element method, computed values of 210 and 99 oersted of the strength of the magnetic field produced by the device 181 were obtained for the aforementioned distance c of 0.1 and 0.3 mm, respectively. Thus it is shown from the results of simulation that the strength of the produced magnetic field is suffi-cient for carrying out a reliable magneto-optical recording.

EXAMPLE 7

Figure 15:
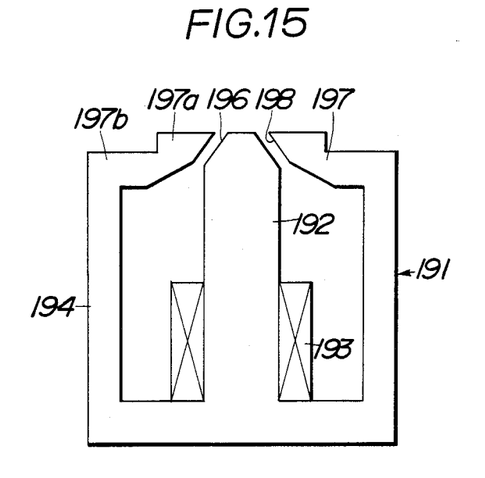
FIG. 15 is a sectional view showing the configuration of a device for producing a high frequency modulating magnetic field according to the seventh embodiment of the present invention.

A modulating field producing device 191 according to the seventh embodiment of the present invention has a terraced extension 197, as shown in FIG. 15.

Thus, in a modulating field producing device 191, shown in cross section in FIG. 15, a winding 193 is placed on a main magnetic pole 192 for exciting the pole 192 magnetically as in the preceding embodiments. In the present embodiment, a tapered surface 196 is formed on the side of the main magnetic pole 192 facing to the magneto-optical recording medium and a yoke 194 has an extension 197 the end face of which faces to the tapered surface 196 with a substantially uniform gap g in-between. This extension 197 is made up of a first extension 197a and a second extension 197b.

The first extension 197a has a substantially flat side facing to the magneto-optical recording medium so as to be used as the return path for the magnetic fluxes from the recording medium. The first extension 197a is also formed with an edge surface 198 spaced apart a substantially uniform distance from the tapered surface 196 and surrounding the end part of the main magnetic pole 92. The second extension 197b is disposed between the first extension 197a and the cylindrical portion of the yoke 194 with a spacing from the magneto-optical recording medium larger than that between the first extension 197a and the recording medium.

In this manner, the modulating magnetic field producing device 191 has the terraced extension 197 such that only the portion of the extension 197 close to the main magnetic pole 192 faces to the magneto-optical recording medium. Since the second extension 197b is swept back in the modulating magnetic field producing device 191, the device 191 can be mounted easily with visual checking, while there is no risk of a possible contact with the magneto-optical recording medium.

The strength of the magnetic field obtained with the present fourth embodiment is found by measurement to be sufficient in achieving a positive magneto-optical recording. Thus the strength of the magnetic field as measured with the current of 1A supplied to the winding 193 was 199 and 104 oersted for the aforementioned distance c of 0.1 and 0.3 mm, respectively. Thus it is seen that the magnetic field strength obtained with the modulating magnetic field producing device 191 of the present embodiment is about equal to that of the modulating magnetic field producing device 101 of Example 5.

In the high-frequency modulation field producing device of the present invention, the sheathed conductor consisting of a parallel connection of plural insulated elementary wires is wound about the main magnetic pole. In this manner, the skin effect in which the current flows predominantly in the peripheral region of the conductor may be prevented so that heat generation from the sheathed conductor may be suppressed to attain a stable recording and reduction in the power consumption.

The low-loss magnetic material is used as the main magnetic pole material such that, in conjunction with the use of the above-described sheathed conductor consisting of the insulated elementary wires, the inverting magnetic field of the strong constant intensity in the high frequency range can be produced efficiently without objectionable heat generation. In this manner, the device is effective as the bias coil in the magnetic field modulation system whereby it is sufficiently possible to effect an overwriting on the real-time basis.

If needed, there may be provided a yoke constituting the magnetic path or a tapered part at the foremost part of the main magnetic pole. This arrangement is particularly effective when the device is arranged at a closer position to the magneto-optical recording medium.

Further in case that the yoke is extended towards the main magnetic pole on the side thereof facing to the magneto-optical recording medium, a magnetic field sufficiently strong and suitable for magneto-optical recording is produced. In addition, the yoke thus extended faces to the main magnetic pole with a required gap in-between. Due to the presence of this gap, the amount of the magnetic fluxes applied to the recording medium is increased so that an effective magneto-optical recording is realized.

What is claimed is:

1. A device for producing a high frequency modulating magnetic field applied to a magneto-optical recording layer to determine the magnetization direction in the magneto-optical recording layer upon locally heating the layer by a focused laser beam, comprising:
   a main magnetic pole formed of a low-loss soft magnetic material, said main magnetic pole having one end facing said magneto-optical recording layer and having a tapered portion at said one end;
   a yoke completely surrounding and magnetically connected to said main magnetic pole at the other end of said main magnetic pole, said yoke having an extended portion extending towards said main magnetic pole at the one end facing said magneto-optical recording layer and forming a required gap between it and said tapered portion of said main magnetic pole; and
   a sheathed conductor wound about said main magnetic pole, said conductor consisting of a parallel connection of a plurality of insulated elementary wires supplied with high frequency current to generate a high frequency magnetic field at said one end of said main magnetic pole.

2. A device according to claim 1, wherein said tapered portion is formed to have an angle not more than 50 degrees with an axis of said main magentic pole.

3. A device according to claim 1, wherein said magnetic pole has a diameter between 0.1 and 3.0 mm at said one end thereof.

4. A device according to claim 1, wherein said extended portion is inclined relative to said magneto-optical recording layer.

5. A device according to claim 1, wherein said extended portion has a protrusion portion adjacent around said main magnetic pole.

* * * * *